United States Patent [19]

Bibeau et al.

[11] 4,225,281
[45] Sep. 30, 1980

[54] SELF-LOADING CONTAINER CARRIER TRUCK

[76] Inventors: Jean-Marie Bibeau, 109 Houle Blvd., St. Gabriel de Brandon; Jacques Bibeau, 4621 Castel d'Autray; Marcel Bibeau, 4471 Castel d'Autray, both of St. Felix de Valois, all of Canada

[21] Appl. No.: 944,016

[22] Filed: Sep. 20, 1978

[30] Foreign Application Priority Data

Jan. 19, 1978 [CA] Canada ................................ 295268

[51] Int. Cl.² ............................ B60P 1/28; B60P 1/64
[52] U.S. Cl. .................................... 414/498; 414/549
[58] Field of Search ............... 414/421, 549, 942, 498

[56] References Cited

U.S. PATENT DOCUMENTS

| 3,819,075 | 6/1974 | Derain | 414/549 |
| 3,825,137 | 7/1974 | Mackrill et al. | 414/498 |
| 3,874,537 | 4/1975 | Kou | 414/498 |
| 3,942,664 | 3/1976 | Lemaire | 414/498 |
| 4,009,791 | 3/1977 | Derain | 414/498 |

Primary Examiner—Stephen G. Kunin
Assistant Examiner—Lawrence E. Williams

[57] ABSTRACT

A container carrier truck adapted to load and unload a container thereon and to conventionally dump a load and characterized by hydraulic cylinders arranged relative one to the other and to a pivoted loading-unloading frame to each be positioned in its optimum action position when the demand thereon is optimum. This truck includes a guideway for longitudinal displacement of the pivoted frame, a carriage also longitudinally displaceable along the guideway, a pair of hydraulic cylinders on the effectively opposite sides respectively of the pivotal frame, an abutment, and a catch device to hold the pivotal frame and carriage in a predetermined loading-unloading position along the guideway, one hydraulic cylinder exclusively producing pivoting of the pivoted frame, and the other producing pivoting and longitudinal displacement of the frame.

9 Claims, 10 Drawing Figures

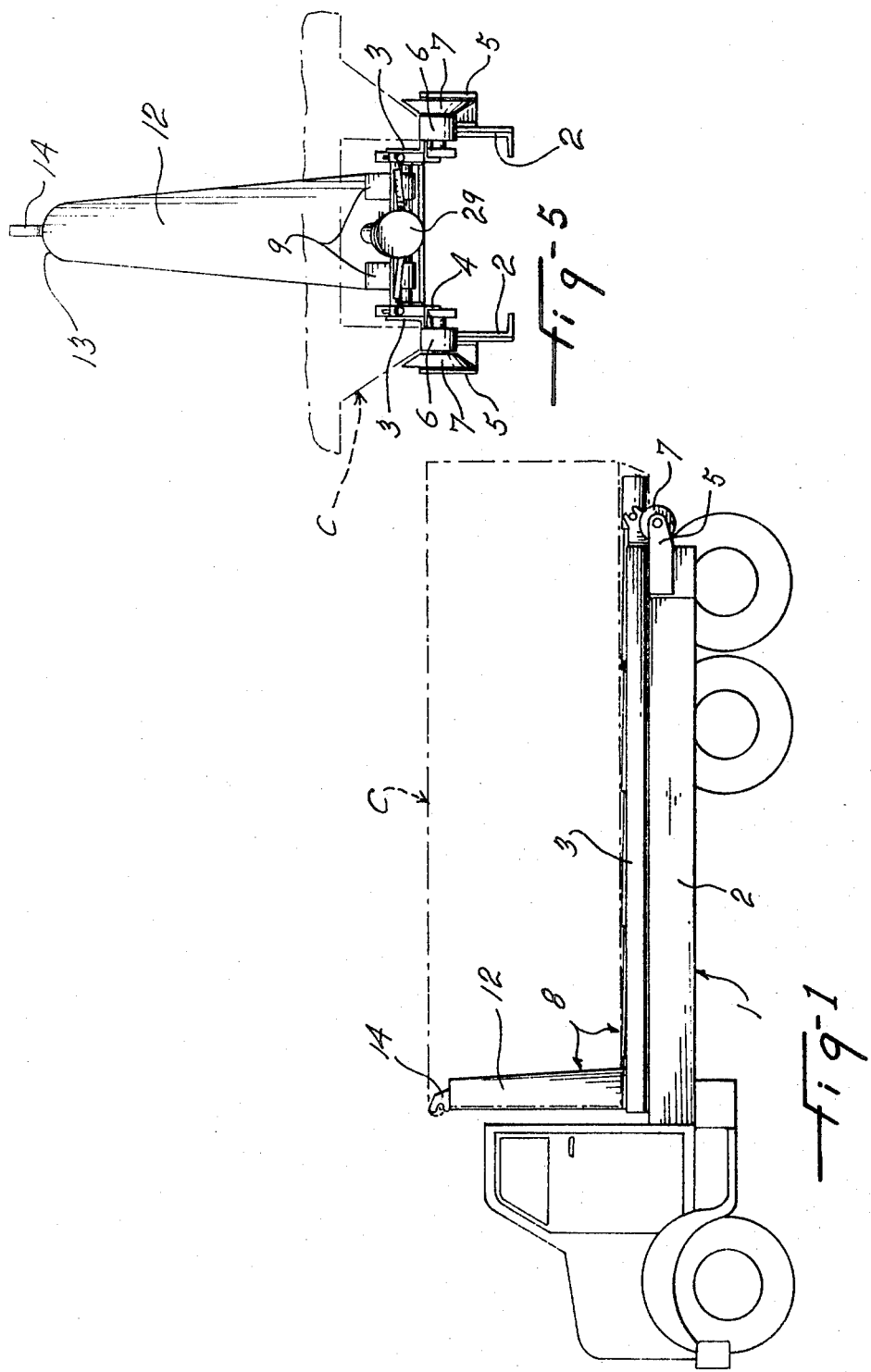

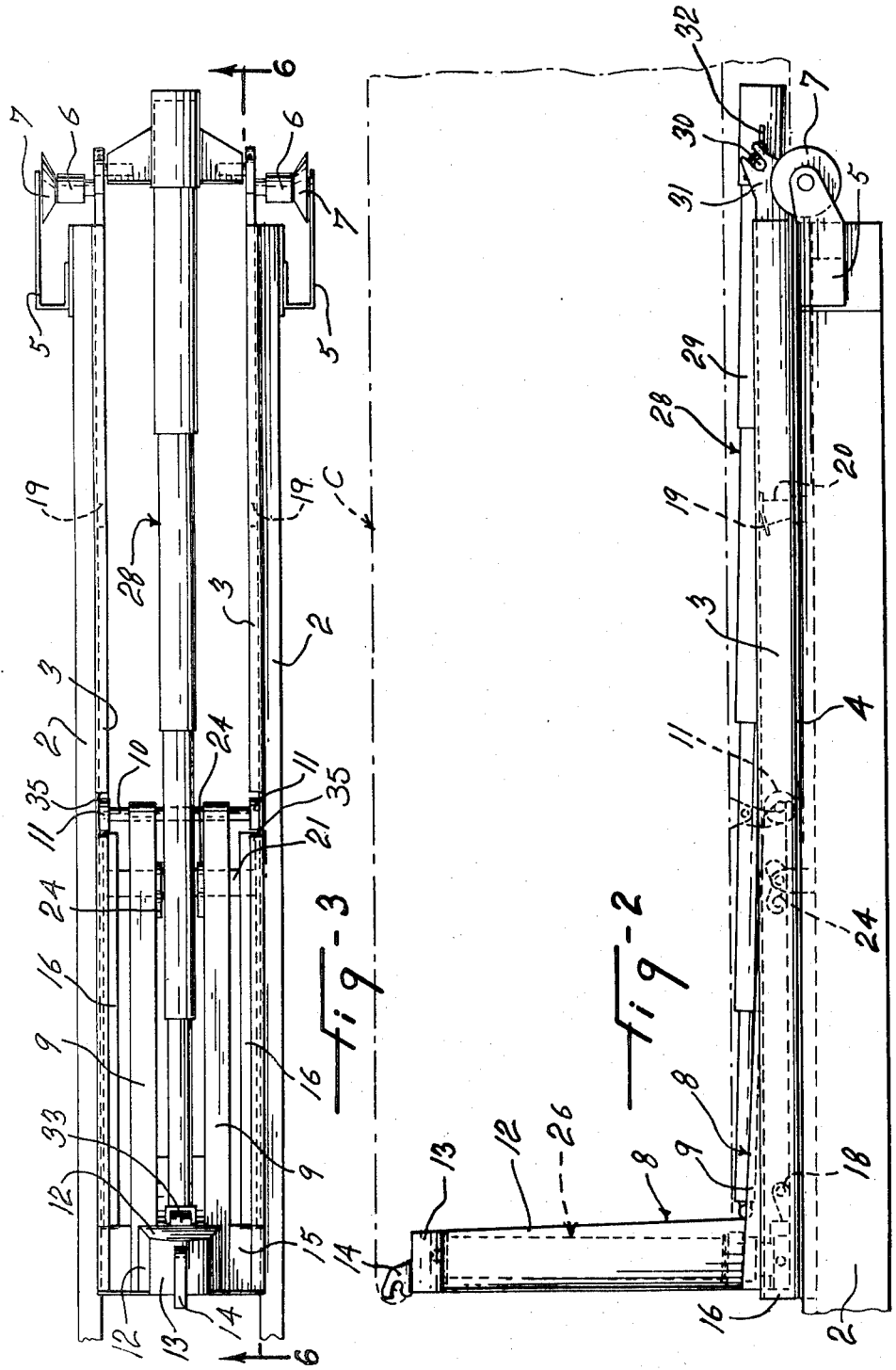

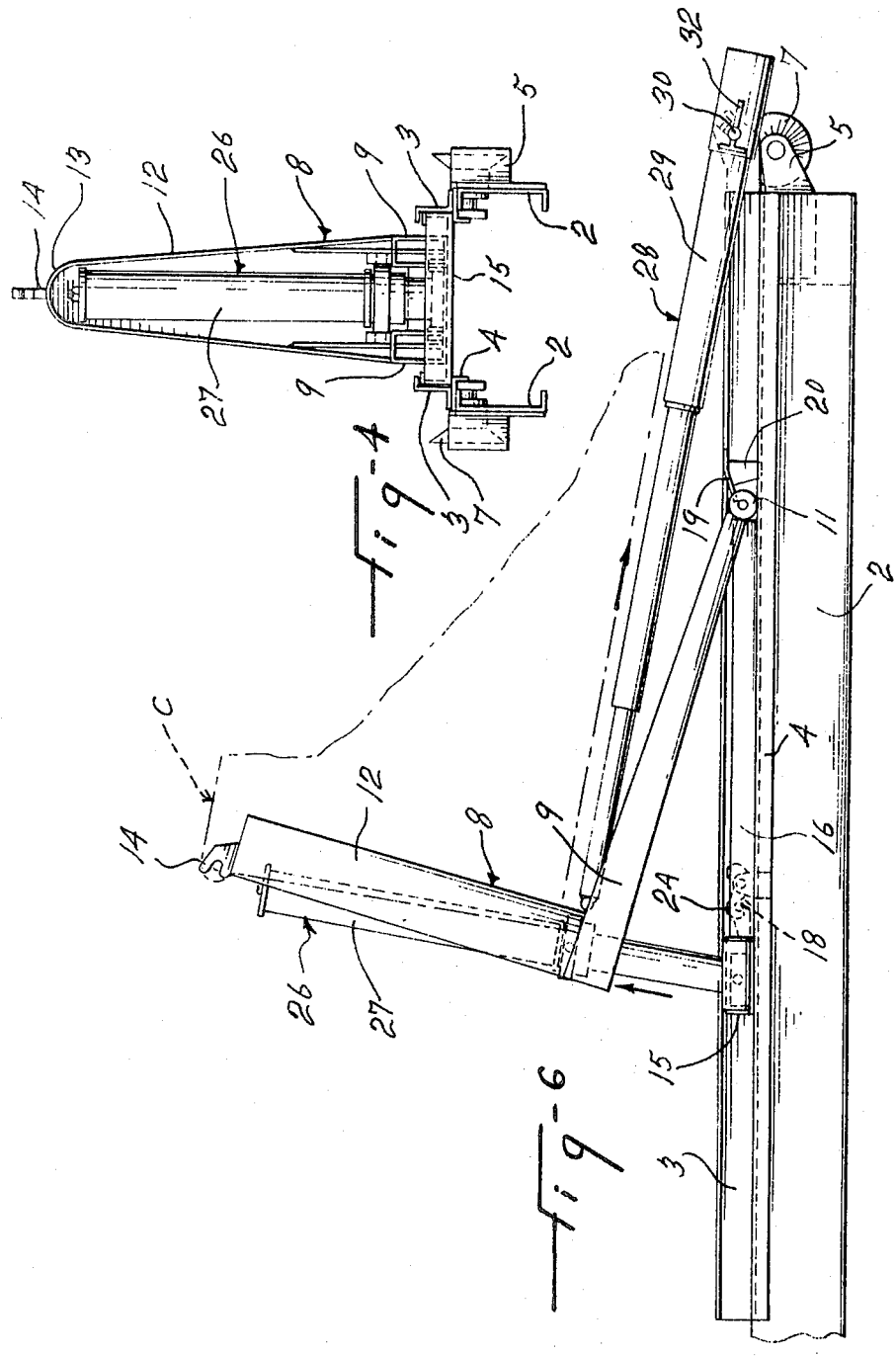

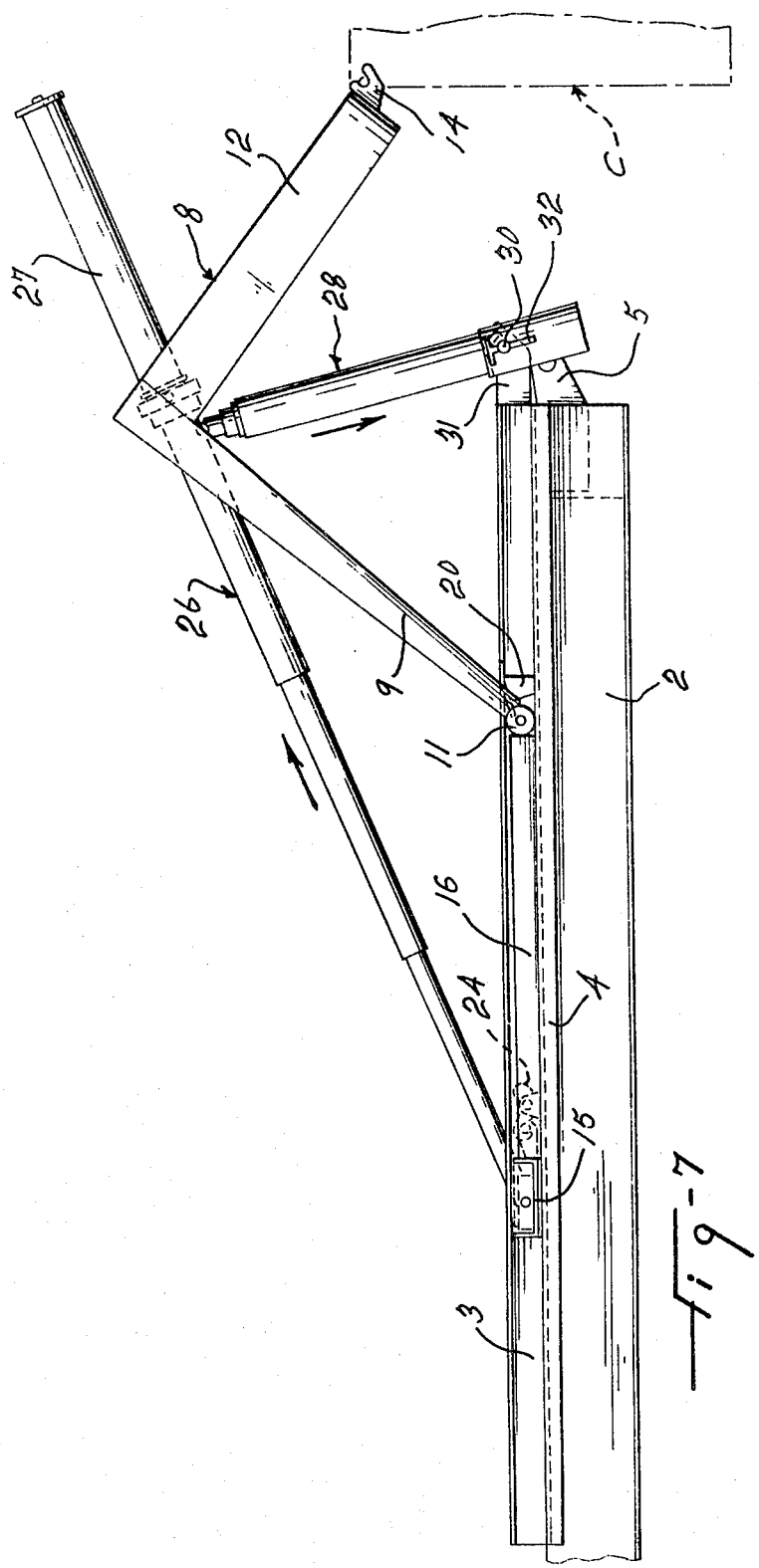

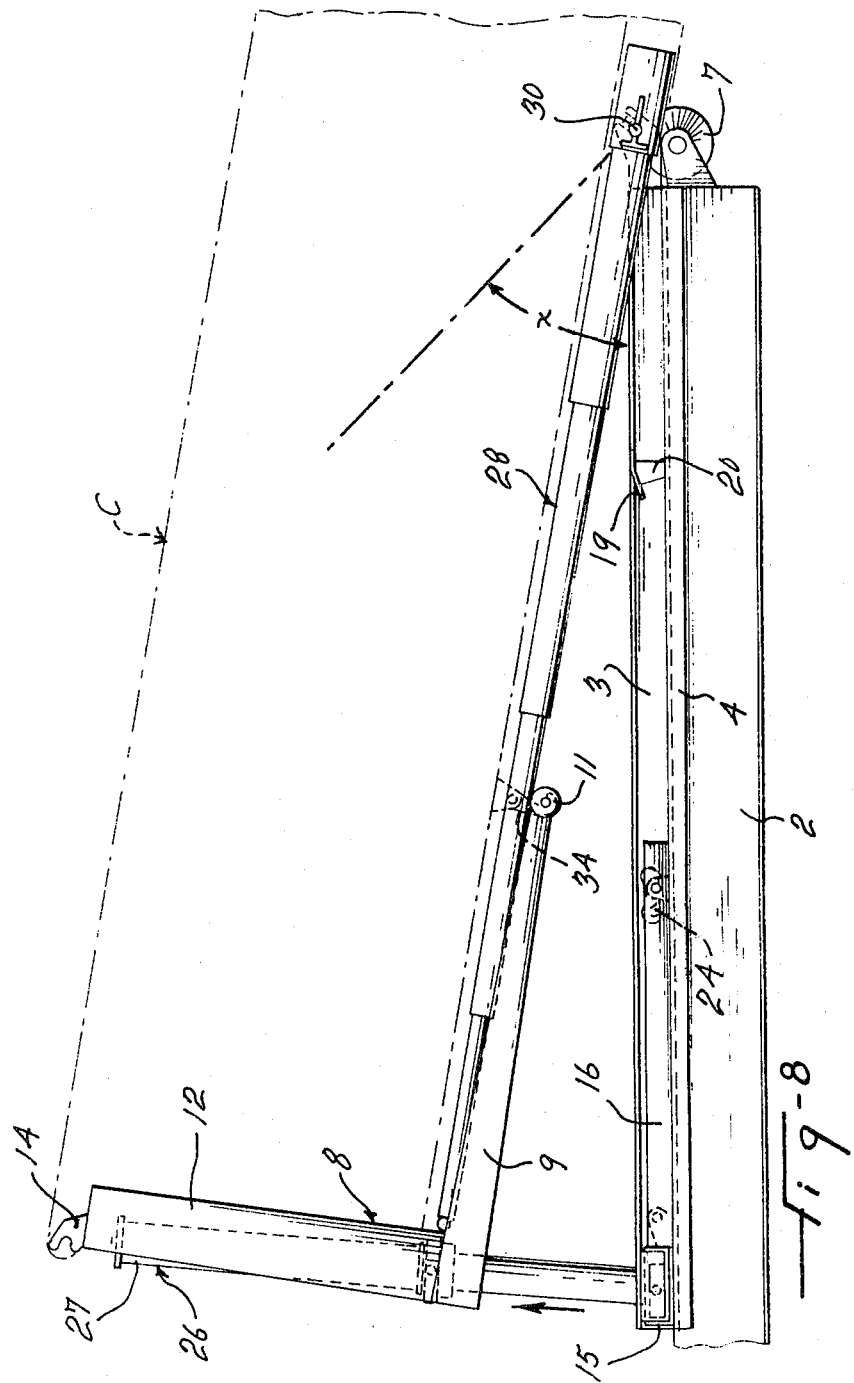

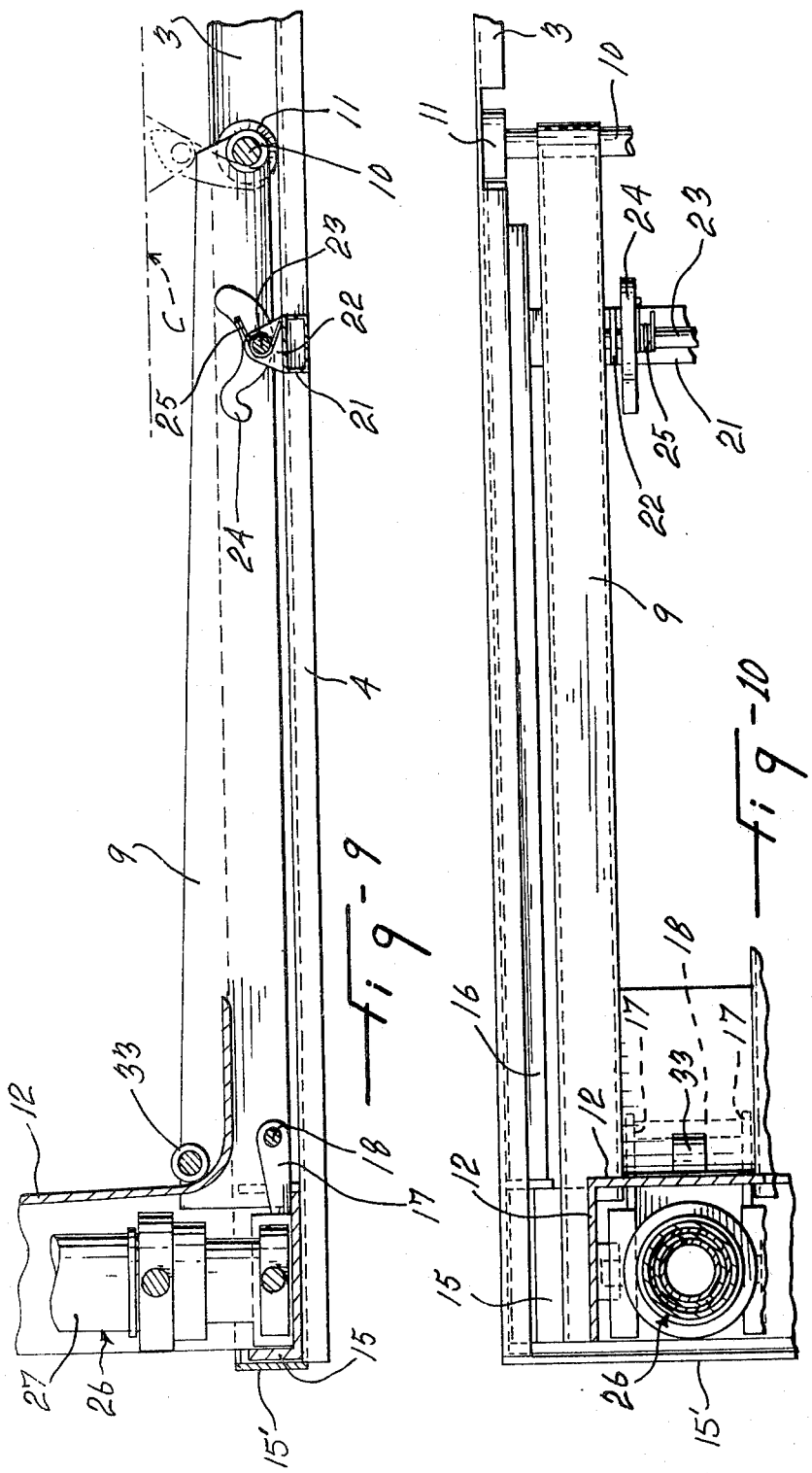

SELF-LOADING CONTAINER CARRIER TRUCK

This invention relates to a truck of the type adapted to carry a container.

The trucks of the above type which have been proposed by others so far are merely adapted to secure a container or containers thereon. The container is loaded and unloaded by a separate crane. This is found disadvantageous, since a crane must be available for this job and this presents a problem particularly for unloading at destination. Besides, a crane is an expensive piece of equipment which has no raison d'etre if used only casually.

It is a general object of the present invention to provide a self-loading container carrier truck to avoid the dependency on the use of a crane to load and/or unload a container on a truck.

It is a more specific object of the present invention to provide a self-loading container carrier truck which is constructed and arranged to produce loading and unloading of a container and still allows conventional dumping of a load.

It is another object of the present invention to provide a self-loading container carrier truck which includes hydraulic cylinders relatively arranged and acting in their optimum configuration when the demand thereon is optimum.

More particularly, it is another object of the present invention to provide a self-loading container carrier truck with a pair of hydraulic cylinders relatively arranged relative to each other and to a pivotable loading-unloading frame such that for loading one cylinder will be angularly positioned for maximum strength or action while for unloading, the cylinder will be angularly positioned for maximum strength.

The above and other objects and advantages of the present invention will be better understood with reference to the following detailed description of a preferred embodiment thereof which is illustrated, by way of example, in the accompanying drawings; in which:

FIG. 1 is a side elevation of a self-loading container carrier truck according to the present invention;

FIG. 2 is a side elevation view of the container loading, unloading, and dumping assembly forming part of the truck in FIG. 1;

FIG. 3 is a top plan view as seen from above in FIG. 2;

FIG. 4 is a front end view of the assembly of FIGS. 2 and 3, as seen from the left in these figures;

FIG. 5, on the same sheet as FIG. 1, is a rear end view of the same assembly;

FIGS. 6, 7 and 8 are cross-sectional views as seen along line 6—6 in FIG. 3 and showing sequential positions of the movable elements of the container loading, unloading, and dumping assembly;

FIG. 9 is an enlarged scale partial cross-sectional view taken along the longitudinal axis of the truck; and FIG. 10 is an enlarged scale partial view of FIG. 3 with parts in cross-section as seen from above in FIG. 9.

The illustrated self-loading container carrier truck includes a chassis formed of the conventional pair of channel members 2 which have their open side inwardly facing each other. A guideway is fixedly secured to the channel members 2 and is formed of a pair of profiled members 3 which, as best shown in FIG. 4, cooperatively form a pair of mutually facing channels in cooperation with the angle member 4 fixed on the top flange of the channel members 2.

A bracket 5 is fixedly secured against the outside of each channel member 2 at the rearward end thereof and rotatively supports a carrying roller 6 and a guiding conical roller 7. The rollers 6 and 7 serve to rollably carry and laterally guide a container C thereon.

A loading-unloading frame 8 is displaceably mounted on the truck chassis and has an L shape configuration. The L shape loading-unloading frame 8 includes opposite end portions which project endwise from an elbow portion. One end portion forms a base which includes a pair of laterally spaced-apart tubular arms 9 extending lengthwise longitudinally of the truck chassis. An axle 10 extends transversely through the rear ends of arms 9 and carries a pair of rollers 11 on its opposite ends respectively. The rollers 11 rollably engages in the roller tracks formed by the profiled members 3 and thus provide for rolling displacement of the loading-dumping frame 8 longitudinally of the truck chassis. The other end portion of the loading-dumping frame 8 constitutes a post end, together with the elbow portion, forms a trough shape, forwardly open recess, as best shown in FIGS. 4, 9 and 10. This recess is defined by side walls 12 and a top 13. A hook 14 is fixedly secured on the top 13 and is forwardly opened when the frame 8 is in the container carrying position. Thus, as shown in the FIGS. 1, 2, 6 and 8, this hook 14 forwardly retains or restrains the container C.

A carriage is longitudinally displaceable along the guideway defined by the profiled members 3. This carriage includes a cross member 15 and a pair of laterally spaced-apart tube members 16 which are fixedly secured to the cross member for bodily displacement therewith. The tube members 16 are slidable endwise in the channels defined by the profiled members 3. A front abutment member 15' (see FIGS. 9 and 10) secured to the front of tracks 3, limits the forward movement of carriage 15–16. A pair of brackets 17 project endwise rearwardly from the cross member 15 and fixedly carry a catch pin 18 extending transversely of the guideway members 3.

At a predetermined position along each profiled member 3 there is formed an abutment member 19 held by a welded plate 20. A transverse member 21 of square tubing is rigidly fixed at the opposite ends to the angle members 4 and carry a pair of fixed brackets 22. Brackets 22 carry a shaft 23 on which are pivotally mounted latch members or hooks 24 adjacent the respective brackets 22, and which, as seen in FIG. 9, are biased counterclockwise by a spring wire 25.

The abutments 19 stops the rearward longitudinal displacement of the loading-unloading frame 8 by engagement of the rollers 11 against them. The hooks 24 cooperatively form a latch device with the axle or pin 18 to lock the carriage against forward displacement after rearward displacement of the latter until the bars 16 abut against the rollers 11, as shown in FIGS. 6 and 7 which illustrate a loading-unloading position.

A first telescopic hydraulic 26 cylinder is pivotally connected at its larger end to the loading-unloading frame 8 and at its smaller end to the cross member 15 of the carriage. The larger cylinder 27 of the telescopic sections is pivotedly connected at its open end to the elbow portion of the pivotal frame 8 about a transverse axis. Thus, the larger cylinder 27 is pivoted in the aforementioned trough shape and forwardly open recess. The whole hydraulic cylinder 27 fully retracts both pivotally and telescopically in this recess when the frame 8 is lowered to its carrying position shown in FIGS. 1 and 2.

A second telescopic hydraulic cylinder 28 is pivotally connected at its larger end to the rear of the truck chassis and at its smaller end to the loading-unloading frame 8 on the effectively opposite side of the latter relative to the hydraulic cylinder 26. The larger cylinder 29 of the telescopic hydraulic cylinder 28 is of double action type while all the other sections can be of single action only. The larger cylinder 29 is pivoted by transverse pins 30 retained by brackets 31. The pins 30 outwardly project from reinforcing plates 32. The smaller end of the telescopic hydraulic cylinder 28 is pivotally connected to a sleeve portion 33 rigidly secured at the rear of the aforementioned elbow portion.

The container C is unloaded as follows. The larger cylinder section 29 is retracted causing the rollers 11 to abut against the abutments 19 and the bars 16 to abut against the same rollers. In this loading-unloading position shown in FIG. 6, the hooks 24 engage the pin 18 and hold the carriage against forward displacement. The hydraulic cylinder 26 is thereafter extended to pivot the loading-unloading frame 8 to the position of FIG. 7. The hook 14 may then release an appropriate catch or pin at the top and front of the container C. The extension of the cylinder 28 causes a container C to be loaded by pulling action of the hook 14 thereon.

When a container C comes to its carrying position on the truck, a pair of hooks 34 pivotally hanging from it can hookingly engage the axle 10 with which they register. If it is only desired to dump a load, the cylinder 26 only is actuated, to pivot the frame 8 a desired angle x about the axis defined by the pins 30 as shown in FIG. 8. During this operation, frame 8 is hooked to the container C by hooks 14 and 34 and rollers 11 of frame 8 simply move freely through openings 35, made in the top flange of profiled members 3, as shown in FIG. 3.

It must be noted that the abutments 19 are arranged to form abutments as aforementioned, and also to abut and unlatch the hooks 34 upon rearward movement of frame 8, thus releasing the container for pivoting thereof relative to the frame 8, during its unloading operation.

The cylinder 26 merely produces pivoting of the frame 8 while cylinder 28 merely produces longitudinal displacement of the same frame as well as pivoting thereof. The one-way sections of the cylinder 28 allow free retraction of the cylinder in reaction to extension of the cylinder 26. Cylinder 26 can be single-acting in the extension direction. During the dumping operation, (see FIG. 8) frame 8 and container C are in their foremost position relative to the truck chassis and, therefore, the center of gravity of container C and frame 8 remain ahead of rollers 6 and 7, which support container C. Cylinder 26 can therefore retract freely during return of the container from a dumping position. Cylinder 26 produces unloading of container C, while cylinder 28 produces loading of the container and back-and-forth movement of the pivotal axis 10 of frame 8 between its foremost and its rearmost position. Obviously, cylinder 26 could be double-acting to help cylinder 28 during loading of the container. All sections of cylinder 28 could be double-acting to help cylinder 26 during unloading, whether cylinder 26 is single- or double-acting. Obviously, the term "container" includes a dumping box, a platform, another load carrier as well as a conventional container.

What we claim is:

1. A self-loading container carrier truck comprising a truck chassis, a guideway mounted on said truck chassis and extending longitudinally thereof, a loading-unloading frame of L-shaped configuration comprising a front post portion and a rearwardly extending base portion rigid with said post portion and forming an elbow portion therewith, said base portion operatively engaging said guideway and displaceable along the latter, said loading-unloading frame movable along said guideway between rearmost and foremost positions and also pivotable with respect to said guideway about an axis transverse to said guideway at the rear end of said base portion between a rest position in which said base portion is coincident with said guideway and a pivoted position in which said base portion extends upwardly and rearwardly of the guideway, a hook fixed to the free upper end of said post portion for hooking a container to the latter, a first hydraulic actuator means pivotally connected to the rear end of said truck chassis and to said elbow portion, a carriage displaceable in said guideway between a forward limit position and rearward limit position, and having a front carriage portion located under said post portion when said loading-unloading frame is in rest position, a second hydraulic actuator means connected to said carriage portion and to said elbow portion of said loading-unloading frame, and retaining means to releasably maintain said carriage in its forward and rearward limit positions respectively, said loading-unloading frame taking a container-carrying position when in rest position and in foremost position, and taking a container-releasing and pick-up position when in pivoted and rearmost position, said first hydraulic actuator means extending longitudinally of said truck chassis in the rest position of said loading-unloading frame and operable to move said carriage and loading-unloading frame longitudinally of said chassis between said forward and rearward limit position of said carriage and said foremost and rearmost position of said loading-unloading frame, and also operable to pivot said loading-unloading frame from its pivoted position to its rest position, said second hydraulic actuator means operable to pivot said loading-unloading frame from its rest position to its pivoted position, said second hydraulic actuator means adapted to be operated when said first hydraulic actuator means has moved said loading-unloading frame to its rearmost position, so as to pivot said loading-unloading frame towards its container-releasing and pick-up position, said first and second hydraulic actuator means being arranged in complementarily opposite relationship, one of said hydraulic actuator means undergoing retraction upon extension of the other hydraulic actuator means, said first and second hydraulic actuator means forming two sides of a triangle when said loading-unloading frame is in pivoted position with said truck chassis forming the third side of said triangle.

2. A self-loading container carrier truck as defined in claim 1, wherein said guideway includes two spaced, parallel tracks and said base portion of said loading-unloading frame is provided with side rollers at its rear end engaging said tracks, said rollers constituting the pivotal axis of said loading-unloading frame, said base portion extending between and clearing said tracks to allow pivoting of said loading-unloading frame, said retaining means including first abutment means located along said tracks rearwardly of said carriage and of said rollers, said rollers abutting against said first abutment means in the rearmost position of said loading-unloading frame, said carriage having arms disposed forwardly of said rollers and maintaining the latter against said abutment means in the rearmost position of said loading-unloading frame, means carried by said chassis and releasably maintaining said carriage in the rearward limit position of the latter, said retaining means further including second abutment means secured to said tracks forwardly of said carriage, the latter abutting against said second abutment means in its forward limit position, extension of said second hydraulic actuator means, when said carriage is maintained in its forward limit position and said loading-unloading frame is in a container-carrying position and a container is attached thereto by said hook causing dumping movement of said container.

3. A self-loading container carrier truck as defined in claim 1 or 2, wherein said first and second hydraulic actuator means each constitute a telescopic cylinder and piston unit including a piston rod and an outer cylinder, said outer cylinder of said second hydraulic actuator means having an end closest to the free end of its piston rod and an end farthest away from the free end of said last-named piston rod, the free end of said last-named piston rod being pivotally connected to said carriage portion and the end of the outer cylinder closest to the free end of said piston rod being pivoted to said elbow portion of said loading-unloading frame.

4. A self-loading container carrier truck as claimed in claim 2, wherein said carriage-maintaining means carried by said chasses includes a latch device which is spring loaded and automatically latches said carriage upon the latter attaining its rearward limit position along said guideway during rearward displacement of the latter under the action of said first hydraulic actuator means and automatically releases said carriage when the latter starts its forward movement along said guideway under the action of said first hydraulic actuator means.

5. A self-loading container carrier truck as defined in claim 2, further including inter-engageable hooking means between said container and the base portion of said loading-unloading frame to attach said base portion to said container.

6. A self-loading container carrier truck as claimed in claim 1, wherein said second hydraulic actuator means is a telescopic cylinder and piston unit single acting in the extension direction.

7. A self-loading container carrier truck as claimed in claim 6, wherein said first hydraulic actuator means is a cylinder and piston unit of which one telescopic section is double acting to produce back-and-forth longitudinal displacement of said carriage and loading-unloading frame along said guideway, while the remaining sections of said same telescopic cylinder and piston unit are single acting in the extension direction to produce loading pivoting movement of said loading-unloading frame.

8. A self-loading container carrier truck as defined in claim 1, 6 or 7, wherein said guideway includes roller tracks longitudinally extending along opposite sides of said chassis, said carriage having arms slidable in said roller tracks, and the rear end of the base portion of said loading-unloading frame being provided with a transverse axle and rollers carried at the ends of said transverse axle and rollably engaging said roller tracks and allowing displacement of said loading-unloading frame along said roller tracks and pivotal movement of said loading-unloading frame about said rollers.

9. A self-loading container carrier truck as defined in claim 1, wherein said elbow portion and post portion form a trough-shape forwardly open recess in which said second hydraulic actuator means is nested in the rest position of said loading-unloading frame.

* * * * *